Patented Mar. 11, 1952

2,588,543

UNITED STATES PATENT OFFICE 2,588,543

POLYVINYL ACETATE EMULSION

Walter G. Kunze and Raymond Bertram Evans, Catonsville, Md., assignors to Le Page's Inc., Gloucester, Mass., a corporation of Massachusetts No Drawing. Application April 6, 1950,
Serial No. 154,424

10 Claims. (Cl. 260—29.6)

This invention relates to emulsions of polymers which are suitable for use as coatings and as adhesives. It is particularly concerned with such an emulsion of polymers which is capable of providing a water-resistant bond or coating and which at the same time retains the stability, fluidity and the various other physical properties of such an emulsion which make it particularly useful as a coating or adhesive.

The use of melts and solutions of water insoluble artificial resins in the coating and adhesive art has been supplanted to a large extent by emulsions of such resins, particularly polyvinyl acetate emulsions, due to the improved ease, economy and safety with which aqueous emulsions of the resin may be employed. On the other hand, the usefulness of water insoluble polymer emulsions has been limited by the characteristic lack of water-resistance of the coatings and bonds deposited therefrom at room temperatures and the tendency of such coatings and bonds to reemulsify or disintegrate when subsequently brought into contact with water during the course of normal use of the object or article to which they have been applied.

This lack of water-resistance has been considered innate in the coatings and films deposited from such polymer emulsions inasmuch as water-soluble emulsifying and bodying agents are employed necessarily to establish and stabilize the emulsion. These agents are apparently carried into the film or bond deposited from the emulsion upon application of the emulsion to a surface, and actively exhibit the emulsifying effect on the polymer comprising the body of the coating or film and cause redispersion when the surface is brought into contact with water.

Various proposals have been made to obviate the water-sensitivity of the coatings or bonds deposited from such emulsions, but in general these proposals have been directed to modifying emulsions of such polymers which have been prepared in a specific manner, or require treating the emulsion with certain diluents immediately prior to its application due to the recognized tendency of the suggested diluents to either break or gel the emulsion shortly after the addition of the diluent.

Prior to the instant invention, for example, a common expedient for increasing the water-resistance of a coating or film deposited from a water-insoluble polymer emulsion included the addition of a quantity of one or more substances such a dimethylol urea, trimethylol melamine, certain chromium salts, strong acids or highly reactive aldehydes such as glyoxal, certain resins, toluene and peroxides. In most instances it was required that the substances be added to the polymer emulsion immediately prior to use as the resulting compositions were unstable and certain of the substances resulted in a progressive increase in the viscosity of the emulsion until a gel was formed. Gelling rendered the composition unfit for use in adhesive applicator machines operated at high speed. Additionally, the modification affected by some of these substances did not result in a substantial improvement in the water-resistance of the coating or film deposited from the emulsion, and often imparted undesirable color and foaming characteristics to the emulsion.

Where thermo-plastic polymeric material has been employed, it has been suggested that the water-resistance of the coating or bond deposited from an emulsion of the material can be improved by heating the coating or bond sufficiently to cause coalescence of the material into a homogeneous mass. This procedure is obviously not suitable where the emulsion is employed as a quick-setting adhesive in high-speed mechanical applicators, and in any event the drying and heating suggested is often impractical.

A further suggestion directed to retaining the advantages of working with the polymers in an aqueous medium and at the same time avoiding the inherent disadvantages of water-sensitivity of the coatings or films deposited therefrom requires dispersing the polymer as extremely small particles. The coatings or films deposited from such emulsions do exhibit a satisfactory water-resistance, but due to the fine particle size which imparts the water-resistance, the emulsions do not have the tack necessary to make them useful as quick-setting adhesives.

It is an object of this invention to provide a composition comprising an aqueous emulsion of a polymer, particularly a polymer of vinyl acetate, alone or in combination with small quantities of other monomers, which is stable throughout long periods of storage, and which when employed as a coating or as an adhesive will deposit a coating or bond which is highly water-resistant. A further object of the invention is to provide a process which is generally applicable to modify emulsions of polymers, particularly polyvinyl acetate, which have been polymerized to different extents, or in different manners, and which include various combinations of plasticizers and other diluents commonly employed to develop favored characteristics in the films or coatings deposited from such emulsions.

We have discovered that the water-resistance of coatings or bonds deposited from an aqueous emulsion of polymers, particularly polyvinyl acetate emulsions, which are formulated, or modified, to have a tackiness rendering them suitable for use as quick-setting adhesives, can be established by additions of one or more of a certain group of organic compounds within specific limits. These active compounds are characterized by a particular balance between the parts of the monomeric molecule, one part of which is hydrophilic or polar in nature, and the other part of which is hydrophobic or non-polar. The effectiveness of the compounds in producing water-resistance in the coatings or bonds deposited from such emulsions is apparently due to the presence of both the polar and non-polar groups within the molecule in the prescribed balance.

As a class, these active compounds exhibit solubility, to various extents, in both water and in organic solvents such as mineral spirits, petroleum ether, toluene, castor oil, etc. This solubility in both water and organic solvents apparently is due to the dual hydrophilic-hydrophobic nature of the compound. At it has been generally recognized that the presence of water-soluble emulsifiers carried into the bonds and coatings deposited from emulsions of water-insoluble polymers may later cause redispersion and disintegration of the bonds and coatings, it was particularly surprising to find that incorporating into the emulsion additional compounds which are water-soluble themselves will nullify the effect of the water-soluble emulsifiers and thereby impart water-resistance to the coatings and films deposited from such emulsions.

For present purposes a polar or hydrophilic group or radical may be considered to be one which has a strong affinity for water and which when combined in compounds in which it is the dominant functional group will cause the resulting compound to be immiscible, or miscible to a limited extent, in oil-type solvents. A non-polar or hydrophobic group, on the other hand, may be considered to be one which has slight affinity for water and a strong affinity for oil-type solvents. The hydroxyl group, for example, has a strong polar character. Certain carbon chains, particularly those having from 4 to 8 carbon atoms, may be considered as non-polar.

With regard to the hydroxyl compounds which exhibit the desired balance between the polar and non-polar portion of the compound, it has been found that aliphatic compounds in which the monomeric molecule contains two hydroxyl groups and 4 to 8 carbon atoms in the basic alkyl group produce the desired water-resistance in the films deposited from the polyvinyl acetate emulsions with which the compounds are incorporated. If the number and/or strength of the polar groups is increased beyond the specified relationship to the non-polar residue of the molecule the compound becomes too hydrophilic and will not produce water-resistance. Conversely, if the non-polar portion of the compound becomes dominant the compound becomes too hydrophobic and either no water-resistance results or the coating or film formed therefrom becomes rubbery and has no bond strength after wetting-out. In addition to achieving the necessary balance between the polar and non-polar portions of the molecule of the active compound, it is also necessary to add the compound to the polyvinyl acetate emulsion in certain limited proportions, which vary to some extent according to the initial characteristics of the starting material emulsion, the emulsifiers employed in formulating the starting material emulsion, the average size of the dispersoid, the amount of plasticizers or other diluents present in the starting material emulsion, the age of the starting material emulsion, and the rate at which the composition is formulated, as will be apparent from the following description and examples.

The polar character of the hydroxyl groups appears to be comparatively suppressed in the dihydric alcohols and the butylene groups effectively balance the two hydroxy groups making butylene glycol an active compound.

Ethylene glycol, having a 2 carbon atom chain and 2 hydroxyl groups, was found to be too hydrophilic to act effectively in emulsions which showed no initial water-resistance. The requisite polar-non-polar balance is achieved in the dihydric alcohols butylene to octylene, inclusive, in all their isomeric forms, and these were found to be effective. The 9 carbon atom chain of nonylene glycol, however, dominates the polar residue and the compound exhibited hydrophobic characteristics and was not effective.

The preferred range of quantities of one or more of the active compounds by weight with respect to the solid content of the polyvinyl acetate emulsion has been found to be between about four to twenty-five percent, the optimum amount in a particular instance depending upon the initial water-resistance characteristics of the starting material emulsion, the amount of plasticizers employed, and the rate at which the composition is formulated.

The physical properties of a polyvinyl acetate emulsion such as the viscosity of the emulsion and the tensile strength, flexibility and heat sealing temperature of the film or bond deposited from the emulsion are determined in a large part by the degree of polymerization of the vinyl acetate monomer. A higher degree of polymerization results in increased bond strength, a higher heat sealing temperature and a somewhat higher initial water-resistance, which is, however, considerably less than required commercially for a water-resistant coating or bond. A lesser quantity of the active compounds is necessary to impart the desired water-resistance to the deposited coatings or bonds when the relatively greater water-resistant emulsions are employed as a starting material. The age of the starting material emulsion also determines the susceptibility of the emulsion to water-proofing, the older emulsions, for example, emulsions several months old, show better water-resistance than those freshly made.

For present purposes the polyvinyl acetate starting material emulsions having sufficient tack to be useful as quick-setting adhesives and suitable for improvement according to the instant invention may be classified according to their initial water-resistance although in each instance the water-resistance is negligible from the standpoint of minimum commercial requirements. Such emulsions generally contain about 50–60% polyvinyl acetate by weight, and a bond produced by the respective emulsions between two sheets of mildly calendered white sulphite paper will open up within 24 hours after immersion in water at about 25° C.

Such emulsions which include the commercially available emulsions known as Elvacet No.

80-900, Elvacet No. 81-900, Gelva S-50, Polyco 117H, Polyco 289 and Polyco 117SS produce bonds which show practically no water-resistance on immersion.

Although the most important aspect of the instant invention concerns establishing water-resistance of bonds deposited from polyvinyl acetate emulsions which show no initial water-resistance, it will be apparent that the same compounds which improve the emulsions showing no initial water resistance will be equally effective in lesser quantities in emulsions which deposit bonds which show some initial water-resistance. Accordingly, all of the above starting material emulsions are improved by the herein described active compounds and are useful within the scope of the invention.

The physical characteristics of the commercially available polyvinyl acetate emulsions identified above may also vary to some extent as a result of the emulsifiers and bodying agents employed in producing the emulsions, and also as a result of particular plasticizers employed. In general, however, the variations which tend to increase the relative initial water-resistance of the starting material emulsions lessen the quantity of the active compounds required to affect complete water-resistance.

The amount of active compound required to produce maximum water-resistance in a particular emulsion also varies with the quantity and the nature of the plasticizers, extenders, or other diluents which may be used to develop desired characteristics of fluidity or tackiness in the emulsion, or of flexibility, hardness, etc. in the coating or film deposited from the emulsion. In general, it has been found that the insoluble type of plasticizers and resins in common use increase the effectiveness of the active compounds, and that a lesser quantity of active compound is necessary to produce complete water-resistance when such plasticizers are also present in the emulsion. It should be noted, however, that in each instance the emulsion containing the plasticizers and various other diluents was not initially water-resistant and that the addition of the active compound is necessary to affect any satisfactory water-resistance, although as related above, a lesser amount is necessary when insoluble plasticizers are also present.

This enhancing effect of the insoluble plasticizers was particularly observed with respect to dimethyl phthalate, dibutyl phthalate, chlorinated diphenyls, methyl abiatate and tributyl phosphate, and appears to be characteristic of other common plasticizers such as di-carbitol phthalate, dibutoxy-glycol phthalate, dimethoxyglycol phthalate, butyl phthalyl butyl glycolate, methyl phthalyl ethyl glycolate, triglycol di-2-ethylbutyrate, triglycol di-2-ethylhexoate, tricresyl phosphate and triphenyl phosphate.

On the other hand, the presence of a small amount of certain water-soluble thickeners such as polyvinyl alcohol and sodium carboxymethyl cellulose tend to increase the amount of active compound necessary to effect maximum water-resistance.

In some instances care must be exercised to avoid breaking the emulsion by sudden heating, or by extended heating above the temperature specified. The critical temperature will vary, of course, with the character of the particular starting material emulsion employed.

Ageing the composition tends to increase the water-resistance of the coatings or films deposited therefrom.

It will be apparent from the foregoing that innumerable possibilities for formulating the instant water-resistance composition exist, and that the invention may be practiced to increase the water-resistance of any particular polyvinyl acetate emulsion without materially interfering with the versatility of the starting material emulsion. It will be noted, however, that any of the active compounds having the requisite polar-non-polar balances in the molecules thereof are effective in producing water-resistance when used in quantities within the range of 4–25% by weight of the solids present in the starting material polyvinyl acetate emulsion. The minimum amount of a particular one of the active compounds depends upon the various factors previously discussed, but in all instances is within the range referred to above. Compositions having up to 50% by weight of active compound with respect to the solid content of the polyvinyl acetate starting emulsions may be employed, especially where the active compound has plasticizing properties which are desirable and the cost of the compound is not prohibitive. In most instances, however, the maximum water-resistance is obtained with the least effect on other physical characteristics of the composition when a total of from 7–15% of active compound or compounds by weight of solids in the starting material emulsion are employed. This latter range is particularly suitable when employing hexylene glycol as the active compound. Some of the numerous possibilities which exist in formulating a water-resistant composition within the operable limitations specified above are illustrated in the following examples.

The addition of the active compound to the starting material emulsion may result in a substantial increase in the viscosity of the emulsion to form a cohesive mass unless the active compound is added slowly with continuous agitation. In some instances rapid addition of the active compound results in localized precipitation of the emulsion. The largest part of the increased cohesiveness and viscosity of the emulsion caused by addition of the active compound at a suitable rate disappears on agitation, or when the treated emulsion is permitted to stand for a short period following the addition of the active compound.

In all of the following examples the composition was prepared by stirring the starting material emulsion with a "Lightnin mixer" continuously during the addition of the active compound thereto. The active compound was introduced into the emulsion at the rate of about 3% of the total weight of the active compound per minute. The preparation of the composition may be done at normal ambient temperatures.

Each of the tacky starting material polyvinyl emulsions was applied as a coating on the surface of a moderately calendered and sized white sulphite paper and as a bond between two such papers. The films and bonds thus formed were allowed to dry for 24 hours at room temperature and were thereafter immersed in water at room temperature for 24 hours. Upon removal from the water the wet strength of the paper exceeded the bond strength in all cases, and the bond ruptured when the bonded papers were separated. The coatings in each instance had visibly disintegrated. These starting material emulsions were, therefore, considered non-water-resistant, and in the subsequent experiments, satisfactory water-resistance of a film or bond formed from an emulsion treated with an active compound was considered fully indicated when the strength of the bond exceeded the wet strength of the paper after 24 hours immersion. It will be understood that the films and bonds deposited from emulsions of the type here dealt with comprise the materials found in the emulsion with the exception of the external water phase of the emulsion.

*Example 1*

One hundred ten parts of a tacky polyvinyl acetate emulsion having a solid content of about 58% were agitated with a "Lightnin mixer" and stirred continuously at room temperature while 20 parts of hexylene glycol were added over a period of about one hour. The resulting smooth, white, stable emulsion was slightly more gummy and had a slightly higher viscosity than the starting material emulsion. The resulting composition was tested for water-resistance immediately after formulation and after it had been allowed to stand for 4 months. In both instances it produced a completely water-resistant bond.

Samples were similarly prepared with suitably tacky starting material emulsion taken from five different commercial sources using 15% by weight of hylene glycol with respect to the solid content of the emulsion, and all samples were found to form water-resistant bonds and films.

*Example 2*

110 grams of a polyvinyl acetate emulsion having about 55% solids was intimately intermixed with 6 grams of a methyl abiatate (hercolyn D) plasticizer. The mixture was applied to moderately sized and calendered white sulphite paper as both a film and bond. After the film and bond were permitted to dry for 24 hours they were immersed in water at room temperature. Neither the bond nor the film were water-resistant.

6 samples were thereafter prepared by intermixing 110 grams of the same starting material emulsion, 6 grams of methyl abiatate plasticizer and respectively 3, 4, 7, 10, 12 and 15% of hexylene glycol with respect to the solid content of the starting material emulsion of each sample. The compositions thus prepared were similarly applied as a film and bond. After drying, the films and bonds were immersed in water at room temperature. All of the samples containing 4% or more of hexylene glycol were found to be waterproof after 24 hours immersion. In each instance, the bond strength exceeded the wet strength of the paper.

*Example 3*

5 samples were prepared by intimately admixing 110 grams of a polyvinyl acetate emulsion having about 50% solid content with 9 grams of a chlorinated diphenyl type plasticizer and respectively 2, 4, 6, 8 and 10% hexylene glycol by weight to the solid content of the starting material emulsion. Films and bonds were formed from each sample and tested for water-proofness in the manner described in Example 1. All samples containing 4 or more percent of hexylene glycol were found to be water-proof.

*Example 4*

5 separate samples were prepared by slowly adding to 220 parts of polyvinyl acetate emulsion having about 55% solid content with 3, 10, 15, 20 and 50% octylene glycol by weight of the solid content of the starting material emulsion. Films and bonds were prepared in the manner previously specified and tested for water-resistance. Both the films and bonds of the samples containing more than 3% octylene glycol were found to be water-proof. A further sample was prepared by mixing 12 parts of methyl abiatate plasticizer with 12 parts octylene glycol and adding this mixture slowly with agitation to 220 parts of a polyvinyl acetate emulsion having about 55% solid content. The resulting composition was applied as both a film and bond and both were found to be water-proof when tested in the manner previously specified. A further sample was prepared by mixing 12 parts of methyl abiatate plasticizer with 12 parts of octylene glycol and adding this mixture slowly to 220 parts of a polyvinyl acetate emulsion having about 55% solid content while continuously stirring the mixture. This mixture was thereafter diluted with 24 parts of water while continuing the stirring. Films and bonds deposited from the composition were found to be water-proof.

*Example 5*

A mixture of 30 parts dimethyl phthalate plasticizer and 45 parts of butylene glycol were added with continuous stirring to 550 parts of a polyvinyl acetate emulsion having a solid content of about 50%. 60 parts of water were thereafter added with continued stirring. Films and bonds deposited from this composition were found to be water-proof when tested as described above. A further sample was prepared by adding 45 parts of butylene glycol to the same starting material emulsion. The films and bonds deposited from this composition were found to be water-proof also.

*Example 6*

To 550 parts of a polyvinyl acetate emulsion having a solid content of about 55% were added with continuous stirring 30 parts of a methyl abiatate plasticizer and 60 parts butylene glycol. The resulting composition deposit water-proofed films and bonds when tested as previously described.

A sample was prepared by adding 50 parts of butylene glycol to 550 parts of a starting material emulsion with continuous stirring. The films and bonds deposited from this composition were also water-proof.

It will be apparent that the water-resistant compositions formulated according to the instant invention will considerably extend the usefulness of aqueous emulsions of polyvinyl acetate into the field in which high water-resistance of the bond or coating deposited is necessary, and will find application in bonding or cementing for cellulosic articles such as paper cups which in the course of normal use are exposed to water, and for bonding surfaces of cellulosic material to other surfaces of a hydrophilic character such as masonry. These instant compositions are particularly adapted for use as a sizing where water-resistance of the fabric or the paper to which it is applied is required. It may also be employed in the composition of printing paste, as a finish for paper, paper-board, or foils and in the manufacture of formed or impregnated goods, as well as in distemper paints and the like.

Having thus described the invention, what is desired to be secured by Letters Patent is:

1. A composition comprising a tacky aqueous emulsion of polyvinyl acetate and from 4 to 50% by weight of said acetate of a monomeric unsubstituted glycol which contains 4 to 8 carbon atoms.

2. A composition comprising a tacky aqueous emulsion of polyvinyl acetate, a plasticizer for said acetate, and from 4 to 50% by weight of said acetate of a monomeric unsubstituted glycol which contains 4 to 8 carbon atoms.

3. A composition comprising a tacky aqueous emulsion of polyvinyl acetate, and from 4–25% of a monomeric unsubstituted glycol which contains 4 to 8 carbon atoms.

4. A composition comprising a tacky aqueous emulsion of polyvinyl acetate, a plasticizer for said acetate, and from 4 to 25% of a monomeric unsubstituted glycol which contains 4 to 8 carbon atoms.

5. A composition for depositing a water-resistant adhesive film comprising a tacky aqueous emulsion of polyvinyl acetate having a solid content between about 50-60% by weight, a plasticizer for said acetate, and from 4 to 50% of hexylene glycol.

6. A composition comprising polyvinyl acetate and from 4–50% by weight of said acetate of a monomeric unsubstituted glycol which contains 4 to 8 carbon atoms.

7. A composition comprising polyvinyl acetate and from 4–50% by weight of said acetate of hexylene glycol.

8. A composition comprising polyvinyl acetate, a plasticizer therefor, and from 4–50% by weight of said acetate of a monomeric unsubstituted glycol which contains 4 to 8 carbon atoms.

9. A composition for depositing water resistant adhesive film comprising a tacky aqueous emulsion of polyvinyl acetate having a solid content between about 50-60% by weight, a plasticizer for said acetate, and from 7–15% by weight of said acetate of hexylene glycol.

10. A composition comprising polyvinyl acetate and from 7–15% by weight of said acetate of hexylene glycol.

WALTER G. KUNZE.
RAYMOND BERTRAM EVANS.

REFERENCES CITED

The following references are of record in the file of this patent:

UNITED STATES PATENTS

| Number | Name | Date |
|---|---|---|
| 2,387,967 | Zimmerman | Oct. 30, 1945 |